United States Patent
Eslambolchi et al.

[19]

[11] Patent Number: 5,844,405

[45] Date of Patent: Dec. 1, 1998

[54] METHOD AND APPARATUS FOR LOCATING UTILITY CONVEYANCES IN AN ENCLOSED AREA

[75] Inventors: Hossein Eslambolchi, Basking Ridge, N.J.; John Sinclair Huffman, McDonough, Ga.

[73] Assignee: AT&T Corp., Middletown, N.J.

[21] Appl. No.: 900,585

[22] Filed: Jul. 25, 1997

[51] Int. Cl.[6] .................................................. G01V 3/12
[52] U.S. Cl. ............................... 324/67; 324/66; 324/334
[58] Field of Search ............................... 324/66, 67, 326, 324/332, 334, 344

[56] References Cited

U.S. PATENT DOCUMENTS 4,972,388  11/1990  Kirkland .............................. 324/67 X
5,644,237   7/1997  Eslambolchi et al. .................. 324/326

Primary Examiner—Glenn W. Brown
Attorney, Agent, or Firm—Robert B. Levy

[57] ABSTRACT

A selected one of a plurality of underground utility conveyances(14—14) may be located in an enclosure (10) by providing each conveyance with an electronic marker (18). Each marker is responsive to a first RF signal from an electronic marker locator (32) operated by a utility worker. Upon receipt of the first RF signal, the electronic marker associated with the conveyance of interest responds by broadcasting a second RF signal containing information indicative of the conveyance. The second RF signal is received and processed by the electronic locator marker to locate the conveyance and ascertain information related thereto.

13 Claims, 1 Drawing Sheet

METHOD AND APPARATUS FOR LOCATING UTILITY CONVEYANCES IN AN ENCLOSED AREA

TECHNICAL FIELD

This invention relates to a technique for identifying a pipe or cable within an underground utility vault.

BACKGROUND ART

In urban environments, utilities bury their pipes and cables below ground both for reasons of safety and for esthetics. Such buried utility pipes and cables (hereinafter, ("conveyances") run through tunnels that extend between utility vaults accessible from street level through a manhole. Construction of tunnels to carry buried utility conveyances is extremely expensive so utilities try to maximize the number of conveyances within a given tunnel. Consequently, the spacing between conveyances within a given tunnel is very close, with conveyances often lying one physically on top on another. Thus, for example, a cable of one telecommunications carrier such as AT&T may lie immediately adjacent to that of another carrier, making physical identification difficult since such cables often have a similar appearance.

Presently many utilities locate their buried conveyances by impressing a radio frequency signal unique to that utility on each conveyance. Among the frequencies dedicated to AT&T for cable locating purposes is 440 Hz. Using a signal detector, a utility worker can readily detect a conveyance by detecting whether the conveyance radiates one of the frequencies assigned to the utility. An example of a technique for locating a buried utility conveyance by radio frequency signal detection is disclosed and claimed in U.S. Pat. No. 5,644,237, issued in the names of Hossein Eslambolchi and John S. Huffman, on Jul. 1, 1997, and assigned to AT&T. Utility conveyance location by radio frequency signal detection, as disclosed in the Eslambolchi et al. '237 patent, works well if the conveyance to be located is not too closely spaced to another conveyance, as is usually the case in rural environments. However, in urban environments, where utility conveyances are spaced very closely, the radio frequency signal impressed on one conveyance often interferes with the signal on other conveyances in close proximity, making accurate location very difficult.

Thus, there is a need for a technique for accurately locating a utility conveyance in a confined area with other conveyances that are in close proximity.

BRIEF SUMMARY OF THE INVENTION

Briefly, in accordance with the invention, a technique is provided for accurately locating a buried utility conveyance in an enclosed area, such as a utility vault. To locate the conveyance, a technician operates an electronic marker locator that radiates a radio frequency signal in the vicinity of the conveyance. The signal induces electrical energy in an electronic marker carried by the conveyance. In response to the radiated signal, the electronic marker broadcasts a second signal that identifies the conveyance. The second signal is received by a receiver within the electronic marker locator for processing to identify the conveyance.

In practice, the electronic marker comprises the combination of a Read-Only Memory (ROM), an antenna, and a power conversion circuit. The electrical energy in the signal radiated by the conveyance locating device is converted by the power conversion circuit to a direct current (DC) voltage that powers the ROM. The ROM is programmed with information about its associated utility conveyance, such as the identity of the utility, the origin and destination of the conveyance, the date of its installation, and the conveyance type. When powered by the power conversion circuit, the ROM outputs its stored information via the antenna for broadcast to the electronic marker locator. In practice, the range of the signal broadcast by the electronic marker is sufficient to allow a technician to receive the signal on the electronic marker locator upon only partial insertion of the antenna of the electronic marker locator in a manhole, thus avoiding the need for the technician to enter the manhole should the conveyance not be located.

DETAILED DESCRIPTION

Figure 1:
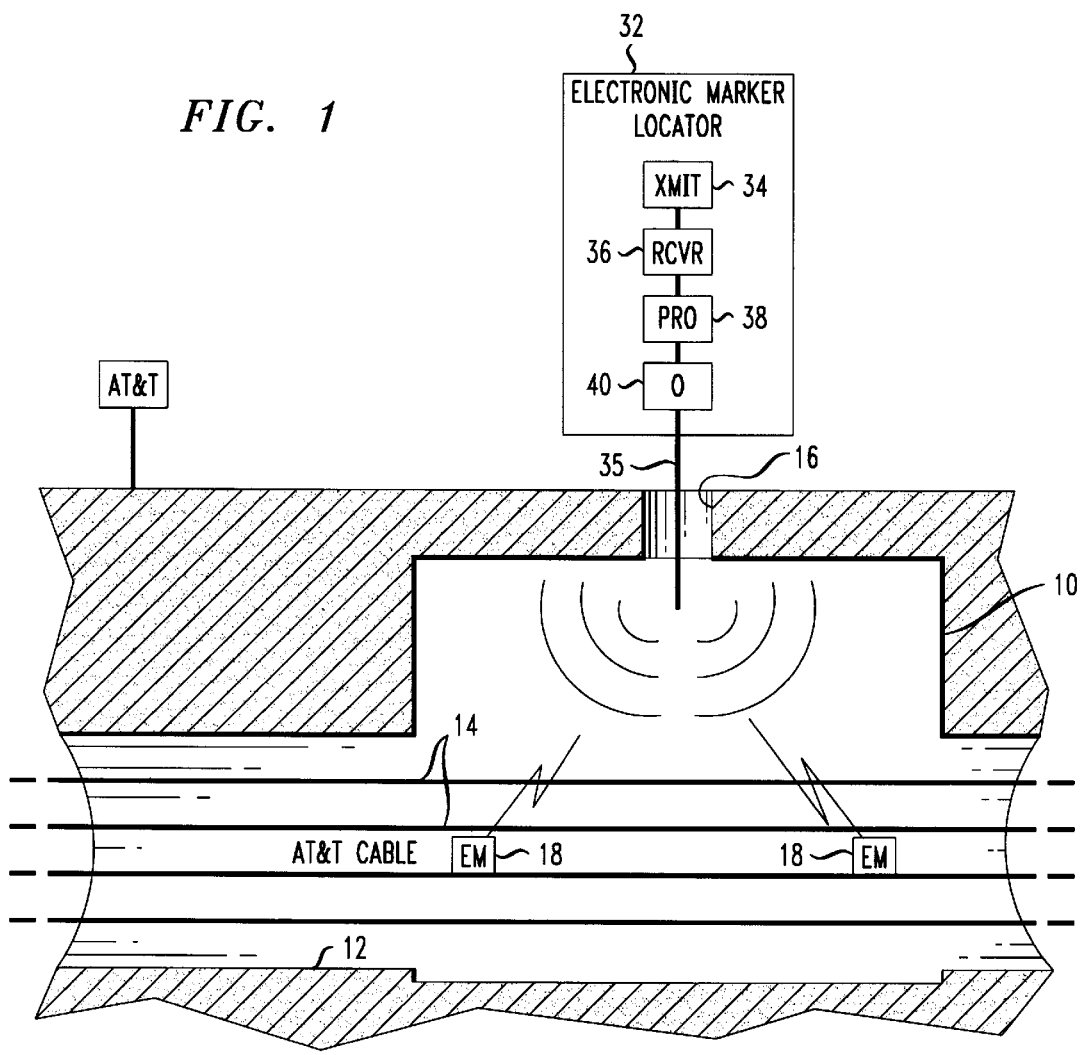
FIG. 1 is a cut-away side view of a utility vault, illustrating the conveyance locating technique of the invention.

FIG. 1 illustrates an underground utility vault 10 in communication with an underground tunnel 12 that carries one or more buried pipes and/or cables ("conveyances") 14—14 that run through the vault into another tunnel (not shown). Within urban areas, utilities, such as AT&T, typically run their conveyances through such tunnels for reasons of safety and aesthetics. The vault 10 is accessible to a utility worker (not shown) through a man hole 16 normally sealed by a man hole cover (not shown). To make a repair to a particular one of the conveyances 14—14, a utility worker removes the man hole cover and then enters the vault 10 through the man hole 16. Thereafter, the utility worker then identifies the particular conveyance and makes the necessary repairs.

Locating the appropriate conveyance for purposes of repair can prove problematic. The space within the vault 10 is often very small. To maximize the number of conveyances 14—14 within the vault 10, most utilities lay their conveyances one on top of another. Often, the conveyances have very similar appearances and usually bear no physical identifying marks, making it very difficult for the utility worker to visually distinguish one conveyance from another. Thus, an AT&T technician trying to make repairs to a particular AT&T conveyance may not be able to distinguish the conveyance needing repair from one that is operating properly.

Past locating techniques that involve impressing a radio frequency signal of a particular frequency on a conveyance of interest have not proven successful in environments where there are many conveyances in close proximity to one another. In practice, the radio frequency signal impressed on one conveyance often interferes with the signals impressed on others that are in close proximity, making it nearly impossible to identify a conveyance by detecting its associated frequency. Even if the frequency can be detected, a particular utility may have several conveyances all radiating the same frequency, making identification of a specific conveyance impossible.

Figure 2:
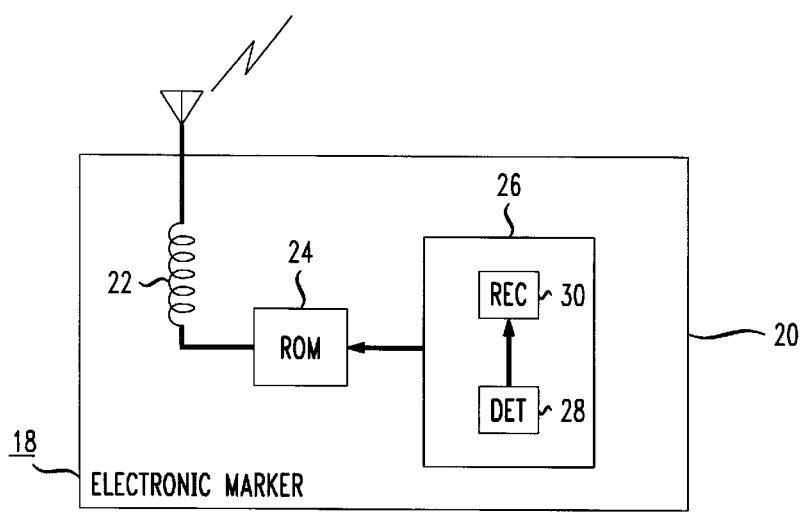
FIG. 2 is a block schematic diagram of an electronic marker comprising part of the conveyance locating technique of FIG. 1.

In accordance with the invention, there is provided a technique for uniquely locating a specific one of the conveyances 14—14, notwithstanding their close proximity to each other. To accomplish conveyance location pursuant to the invention, each conveyance 14 carries an electronic marker 18, the details of which are depicted in FIG. 2. As seen in FIG. 2, the electronic marker 18 includes a hermetically sealed housing 20, made from plastic or the like, containing an antenna 22, a Read Only Memory (ROM) 24 and a power conversion circuit 26. The ROM 24, which may take the form of an Electronically Programmed Read Only Memory (EPROM), contains information about the conveyance to which it is attached, such as the name of the conveyance (typically determined by its origin and destination), the owner of the conveyance, the date of installation, and the type of conveyance. For example, the electronic marker 18 associated with an RL-sheath cable owned by AT&T that runs between Atlanta, Ga. and Birmingham Ala., and installed on Jun. 6, 1988 would store the following information:

| Name of Cable | Atlanta, GA to Birmingham, AL |
|---|---|
| Company | AT & T |
| Date of Installation | 6 June 1988 |
| Type of Cable | AT & T RL Sheath |

Other conveyance-related information, if desired, could be stored in the ROM 24 as well, such as repair information.

The power conversion circuit 26 supplies power to the ROM 24. In practice, the power conversion circuit includes a Detector (DET) 28 tuned to detect an RF signal of a particular frequency. The DET 28 is coupled to a Rectifier circuit (REC) 30 that rectifies the signal detected by the DET 28 to yield a DC signal for powering the ROM 24. As should be appreciated, the ROM 24 remains in a de-energized state until the DET 28 detects the appropriate frequency signal, whereupon the REC 30 converts the received signal into a DC voltage to excite the ROM 24, causing it to output its stored information via the antenna 22 for broadcast.

Referring to FIG. 1, the electronic marker 18 operates in conjunction with an electronic marker locator 32 that includes a transmitter (Xmit) 34. The transmitter 34 broadcasts an RF signal at the frequency of the DET 28 of FIG. 2 via an antenna 35 coupled to the transmitter. In practice, the frequency of the transmitter 34 is adjustable in order to broadcast RF frequencies assigned to different electronic markers 18. The electronic marker locator 32 also includes a receiver 36 coupled to the antenna 35 for receiving the signal broadcast by the marker 18 via the antenna 22 of FIG. 2 from the ROM 24 of FIG. 2 regarding the conveyance 14 carrying the electronic marker 18.

A processor 38 within the electronic marker locator 32 of FIG. 1 is coupled to the receiver 36 for interpreting the conveyance information received by the receiver. The processor 38 may include, or be coupled to an associated memory (not shown) for comparing the received information to stored conveyance information. A suitable output device (O) 40, such as an LCD, for example, or an audio transducer (e.g., a speaker), assuming the processor has text-to-speech conversion capability, is coupled to the processor 38 for converting output information produced thereby into a form intelligible by utility work.

To locate a particular conveyance 14, a utility worker operates the transmitter 34 of the electronic marker locator 32 to broadcast an RF signal for detection by the DET 28 of FIG. 2 to energize the ROM 24 via the REC 30 (both of FIG. 2). Once energized, the ROM 24 outputs its stored information via the antenna 22 for broadcast to the receiver 36 within the electronic marker locator 32 of FIG. 1. The processor 38 of FIG. 1 processes the information received by the receiver 36 and generates output information to the utility worker via the output device 40. From the information output via the output device 40, the utility worker can determine if a particular conveyance has been located, and if so, information about that conveyance.

As compared to prior techniques, the conveyance locating technique of the invention affords much greater accuracy. The problem in the prior art of interference between locating signals carried by adjacent conveyances is avoided because there is no need to impress any type of signal on the conveyance itself for locating purposes. Rather, each electronic marker 18 carried by particular conveyance remains dormant until such time as a utility worker utilizes the electronic marker locator 32 to effectively energize that marker by transmitting a signal at its associated frequency.

Moreover, the conveyance locating technique of the invention obviates the need for a utility worker to descend into the vault 10 for the purpose of locating a particular conveyance. Since harmful heavier-than air gases may become trapped in the vault 10, most utilities have stringent safety requirements concerning vault ventilation and air quality monitoring. With the technique of the invention, a utility worker need only insert the antenna 35 of the electronic marker locator 32 into the man hole 16 for the purpose of triggering the electronic marker 18 associated with a conveyance 14 of interest to broadcast information about the conveyance. In this way, the utility worker need not descend into the vault 10, especially if the vault does not contain a particular conveyance of interest.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for locating an underground utility conveyance comprising the steps of:

broadcasting a first RF signal from an electronic marker detector for detection by an electronic marker associated with such first signal and carried by the underground utility conveyance;

detecting the first RF signal at the electronic marker;

converting the first RF signal at the electronic marker into a DC voltage within the marker to power the marker; and responsive to receipt of the DC power, transmitting from the electronic marker a second RF signal containing information specific to the conveyance to facilitate its location by the electronic marker detector.

2. The method according to claim 1 wherein the second RF signal contains information identifying an owner of the conveyance.

3. The method according to claim 1 wherein the second RF signal contains information identifying a type of conveyance.

4. The method according to claim 1 wherein the second RF signal contains information identifying a conveyance origin and endpoint.

5. The method according to claim 1 wherein the second RF signal contains information identifying a conveyance installation date.

6. The method according to claim 1 wherein the first RF signal is transmitted at a frequency specific to the electronic locator.

7. A system for locating an underground utility conveyance, comprising:

an electronic marker carried by the conveyance and responsive to a first RF signal specific to the marker for transmitting a second RF signal containing information specific to the conveyance to facilitate its location; and an electronic marker locator for transmitting the first RF signal and for receiving the second RF signal to locate the conveyance.

8. The system according to claim 7 wherein the electronic marker comprises:

a power conversion circuit for detecting the first RF signal and for converting the signal into a DC voltage:

a Read Only Memory (ROM) storing information about the conveyance and for outputting the stored information in the form of said second RF signal upon receipt of the DC voltage from the power conversion circuit; and a first antenna coupled to the output of the ROM for broadcasting the second RF signal to the electronic marker locator.

9. The system according to claim 7 wherein the electronic marker locator comprises:

a transmitter for generating the first RF signal;

a second antenna coupled to the transmitter for broadcasting the first RF signal to the electronic marker;

a receiver coupled to the second antenna for receiving the second RF signal broadcast by the electronic marker;

a processor coupled to the receiver for processing the second RF signal; and an output device coupled to the processor for outputting information generated by the processor.

10. The electronic marker according to claim 7 wherein the second RF signal contains information identifying an owner of the conveyance.

11. The electronic marker according to claim 7 wherein the second RF signal contains information identifying a type of conveyance.

12. The electronic marker according to claim 7 wherein the second RF signal contains information identifying a conveyance origin and endpoint.

13. The electronic marker according to claim 7 wherein the second RF signal contains information identifying a conveyance installation date.

* * * * *